(12) United States Patent
Brindle, Jr. et al.

(10) Patent No.: US 11,760,869 B2
(45) Date of Patent: *Sep. 19, 2023

(54) MALEIC ANHYDRIDE GRAFTED LLDPE HAVING HIGH MELT INDEX

(71) Applicant: Westlake Longview Corporation, Houston, TX (US)

(72) Inventors: John H. Brindle, Jr., Cypress, TX (US); Richard K. Stuart, Jr., Longview, TX (US); James H. Scott, Longview, TX (US); David B. Conner, Kilgore, TX (US); Kevin J. Taylor, Longivew, TX (US); Scott T. Trochim, Longview, TX (US)

(73) Assignee: Westlake Longview Corporation, Houston, TX (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/106,328

(22) Filed: Nov. 30, 2020

(65) Prior Publication Data

US 2021/0079208 A1  Mar. 18, 2021

Related U.S. Application Data

(63) Continuation of application No. 16/366,198, filed on Mar. 27, 2019, now Pat. No. 10,882,991, which is a continuation of application No. 16/036,472, filed on Jul. 16, 2018, now Pat. No. 10,738,188, which is a continuation of application No. 14/665,852, filed on Mar. 23, 2015, now Pat. No. 10,053,574.

(60) Provisional application No. 62/038,078, filed on Aug. 15, 2014.

(51) Int. Cl.
| | | |
|---|---|---|
| C08F 255/02 | (2006.01) | |
| C08L 51/06 | (2006.01) | |
| C08L 91/06 | (2006.01) | |
| C09J 151/06 | (2006.01) | |
| C08F 2/01 | (2006.01) | |
| C08L 23/26 | (2006.01) | |
| C08L 91/00 | (2006.01) | |

(52) U.S. Cl.
CPC ............... *C08L 51/06* (2013.01); *C08F 2/01* (2013.01); *C08F 255/02* (2013.01); *C08L 23/26* (2013.01); *C08L 91/00* (2013.01); *C08L 91/06* (2013.01); *C09J 151/06* (2013.01)

(58) Field of Classification Search
CPC ........ C08F 255/02; C08L 51/06; C09J 151/06
See application file for complete search history.

(56) References Cited

U.S. PATENT DOCUMENTS

| | | |
|---|---|---|
| 3,873,643 A | 3/1975 | Wu et al. |
| 4,746,739 A | 5/1988 | Yeats et al. |
| 4,762,890 A | 8/1988 | Strait et al. |
| 4,950,541 A | 8/1990 | Tabor et al. |
| 5,089,556 A | 2/1992 | Tabor et al. |
| 5,194,509 A | 3/1993 | Hasenbein et al. |
| 5,763,516 A | 6/1998 | Godfrey |
| 6,319,979 B1 | 11/2001 | Dubois et al. |
| 6,433,133 B1 | 8/2002 | Coe |
| 6,582,829 B1 | 6/2003 | Quinn et al. |
| 6,608,152 B2 | 8/2003 | Ford et al. |
| 6,765,054 B1 | 7/2004 | Jones et al. |
| 6,890,982 B2 | 5/2005 | Borsinger et al. |
| 7,652,113 B2 | 1/2010 | Ford et al. |
| 7,683,134 B2 | 3/2010 | Roberts et al. |
| 7,893,180 B2 | 2/2011 | Ford et al. |
| 8,076,407 B2 | 12/2011 | Ellis et al. |
| 10,053,574 B2 * | 8/2018 | Brindle, Jr. ............. C08L 23/26 |
| 10,738,188 B2 * | 8/2020 | Brindle, Jr. ............. C08L 91/00 |
| 10,882,991 B2 * | 1/2021 | Brindle, Jr. ............. C08L 51/06 |
| 2004/0045666 A1 | 3/2004 | Gong et al. |
| 2004/0097637 A1 | 5/2004 | Botros |
| 2005/0043482 A1 | 2/2005 | Etherton et al. |
| 2011/0129666 A1 | 6/2011 | Botros et al. |
| 2012/0077048 A1 | 3/2012 | Botros |
| 2012/0128833 A1 | 5/2012 | Patel et al. |
| 2012/0259050 A1 | 10/2012 | Vitrano et al. |
| 2014/0079897 A1 | 3/2014 | Cheng et al. |
| 2014/0183092 A1 | 7/2014 | Otaki et al. |
| 2016/0304650 A1 | 10/2016 | Read et al. |

FOREIGN PATENT DOCUMENTS

| | | |
|---|---|---|
| CN | 103740300 A | 4/2014 |
| GB | 2284152 A | 5/1995 |
| JP | 08-283684 A | 10/1996 |
| JP | 2006-008748 A | 1/2006 |
| JP | 2011-161647 A | 8/2011 |
| JP | 2013-014031 A | 1/2013 |
| WO | 91/09729 A1 | 7/1991 |
| WO | 2007/146875 A2 | 12/2007 |

(Continued)

OTHER PUBLICATIONS

Mirabella et al., J. Poly. Sci.: Part B: Polymer Physics, vol. 25, 777-790 1987).
Mitsui Chemicals Group, Tafmer™ Alpha-Olefin Copolymer, pp. 1-3 (Date Unknown).
Exxonmobil, Webpage, Performance PE Polymers, pp. 1-2 (Date Unknown).
Exxonmobil, Webpage, Polyethylene Products, p. 1 (Date Unknown).
The Dow Chemical Company, Technical Datasheets for DOWLEX™ 2032, 2035, 2045, 2036G, 2038.68G, 2045G, 2047G, 2056G, 2070G, 2078G, 2083G, 2021D, 2036P, 2049G, NG 5056.01G, TG 2085B, and 2064G, pp. 1-51 (2010, 2011, 2012, 2013, 2014, 2015, 2016).

(Continued)

*Primary Examiner* — Irina S Zemel
*Assistant Examiner* — Jeffrey S Lenihan
(74) *Attorney, Agent, or Firm* — Phan Law Group PLLC

(57) ABSTRACT

Disclosed is a linear low-density polyethylene grafted with maleic anhydride (MAH-g-LLDPE). The MAH-g-LLDPE has a unique combination of properties including a low density and a high melt index.

19 Claims, No Drawings

(56) References Cited

FOREIGN PATENT DOCUMENTS

| WO | 2008/097898 A1 | 8/2008 |
|---|---|---|
| WO | 2009/033465 A2 | 3/2009 |
| WO | 2010/134954 A1 | 11/2010 |
| WO | 2011/014714 A2 | 2/2011 |
| WO | 2013/187968 A1 | 12/2013 |
| WO | 2014/040271 A1 | 3/2014 |
| WO | 2015/102886 A2 | 7/2015 |

OTHER PUBLICATIONS

K. Anderson, Technical Report, pp. 1-8 (Jan. 21, 2020).
European Patent Office, Opposition Division, Minutes of Oral Proceedings issued in EP 3 180 369, pp. 1-6 (May 4, 2022).
European Patent Office, Opposition Division, Decision Revoking European Patent No. EP-B-3 180 369, pp. 1-11 (May 4, 2022).
European Patent Office, Summons to Attend Oral Proceedings issued in EP 3180369, pp. 1-10 (Dec. 5, 2019).
Westlake Chemical Corp., Submission filed in EP 3180369, pp. 1-19 (Apr. 15, 2020).
Westlake Chemical Corp., Experimental Report filed in EP 3180369, pp. 1-4 (Apr. 15, 2020).
Dow Chemical Co., Submission filed in EP 3180369, pp. 1-10 (Apr. 16, 2020).
Applied Plastics Engineering Handbook, Chap. 3, pp. 23-48 (Elsevier, Inc.) (2011).
M. Gownder, "Branching of LLDPE as Studied by Crystallization-Fractionation and its Effect on Mechanical Properties of Films," J. Plastic Film & Sheeting, vol. 17, pp. 53-61 (2001).
Handbook of Plastic Films, pp. 45-46 (Rapra Technology Ltd.) (E.M. Abdel-Bary ed., 2003).
European Patent Office, Summons to Attend Oral Proceedings issued in EP 3180369, pp. 1-5 (Jun. 5, 2020).
Int'l Search Report and Written Opinion of the Int'l Searching Authority issued in counterpart Int'l Application No. PCT/US2015/044220 (dated Oct. 21, 2015).
Exxon. "Holt-melt adhesive fundamentals" available on line at http://www.exxonmobilchemical.com/Chem-English/productsservices/adhesives-hot-melt-fundamentals.aspx on Oct. 4, 2010.
Extended European Search Report issued in counterpart EP Application No. 18 179 331.6, pp. 1-6 (dated Nov. 19, 2018).
Extended European Search Report issued in counterpart EP Application No. 22 16 1171.8, pp. 1-8 (dated Aug. 11, 2022).
W. Heinen et al., "13C NMR Study of the Grafting of Maleic Anhydride onto Polyethene, Polypropene, and Ethene-Propene Copolymers," Macromolecules 1996, 29, 1151-1157.
Z.M. Rzayev, "Graft Copolymers of Maleic Anhydride and Its Isostructural Analogues: High Performance Engineering Materials," Int. Rev. Chem. Eng., 3(2011) 153-215.
Dow Chemical Co., "Fact Sheet—Affinity(TM) GA Polyolefin Elastomers," pp. 1-2 (Oct. 2013).
Dow Chemical Co., Invoice 59156207 to Henkel Corp., p. 1 (Mar. 31, 2014) (redacted).
Dow Chemical Co., Invoice 59172154 to Henkel Corp., p. 1 (Apr. 17, 2014) (redacted).
Dow Chemical Co., "Dow Elastomers Case Study: Improve Packaging with Stronger Adhesion for Hard-to-Bond Substrates," pp. 1-3 (date unknown).
Dow Chemical Co., "Technical Information: Affinity(TM) GA 1000R Functionalized Polyolefin Elastomer," pp. 1-2 (Oct. 9, 2012).
S. Yalvac et al., "Innovative Hot Melt Adhesive Solutions for 'Hard-to-Bond' Substrates" (Jul. 2012).
Dow Chemical Co., Opposition against European Patent No. 3180369, pp. 1-15 (Jun. 26, 2019).
Westlake Longview Corporation, Grounds of Appeal filed in File No. T1579/22-3.3.03, pp. 1-31 (Sep. 14, 2022).
Robert Shanks, "Technology of Polyolefin Film Production," Handbook of Plastic Films, pp. 5-12 (Ed. E.M. Abdel-Bary, 2003).
The Dow Chemical Company, Response to Grounds of Appeal filed in File No. T1579/22-3.3.03, pp. 1-42 (Jan. 30, 2023).
Handbook of Thermoplastics, Second Edition, CRC Press, pp. 19-26 and 32-44 (Eds. O. Olabisi et al., 2016).
Handbook of Polyolefins, Second Edition, Marcel Dekker, Inc., pp. 75-79 (Ed. C. Vasile, 2000).
Encyclopedia of Polymer Science and Technology, Concise Third Edition, John Wiley & Sons, Inc., 424-427 (2007).

\* cited by examiner

MALEIC ANHYDRIDE GRAFTED LLDPE HAVING HIGH MELT INDEX

CROSS-REFERENCE TO RELATED APPLICATIONS

This application is a continuation of application Ser. No. 16/366,198 filed Mar. 27, 2019; which is a continuation of application Ser. No. 16/036,472 filed Jul. 16, 2018 (now U.S. Pat. No. 10,738,188 B2); which is a continuation of application Ser. No. 14/665,852 filed Mar. 23, 2015 (now U.S. Pat. No. 10,053,574 B2); which claims the benefit of the filing date of Provisional Application No. 62/038,078 filed Aug. 15, 2014. The entire contents of all four applications are hereby incorporated by reference.

FIELD OF THE INVENTION

The invention generally relates to linear low-density polyethylenes (LLDPEs) grafted with maleic anhydride, their uses, and processes for making them.

BACKGROUND OF THE INVENTION

U.S. Pat. No. 5,194,509 discloses peroxide-free grafting of homopolymers and copolymers of ethylene having densities equal to or greater than 0.930 g/cm$^3$. While exhibiting improved adhesion, the grafted polymers have a low melt index (<4 g/10 min).

U.S. Pat. No. 6,433,133 B1 discloses a process for reducing the weight average molecular weight and melt index ratio of polyethylenes. The polyethylenes may be grafted. The grafted polyethylenes have a melt index only as high as 37 g/10 min.

There is a need in the art for maleic anhydride grafted LLDPEs that have improved properties, such as greater adhesion over a wide temperature window.

The present invention addresses this need as well as others, which will become apparent from the following description and the appended claims.

SUMMARY OF THE INVENTION

The invention is as set forth in the appended claims.

Briefly, in one aspect, the present invention provides a linear low-density polyethylene (LLDPE) grafted with maleic anhydride (MAH-g-PE). The MAH-g-LLDPE has a melt index (MI) of 250 to 800 g/10 minutes and comprises 0.01 to 3 weight percent of maleic anhydride, based on the weight of the MAH-g-LLDPE.

The MAH-g-LLDPE is particularly useful in adhesive compositions, including hot melt adhesives.

Thus, in a second aspect, the present invention provides a hot melt adhesive (HMA). The HMA comprises the MAH-g-LLDPE according to the invention, a tackifier resin, and a wax.

In a third aspect, the present invention provides a process for preparing the MAH-g-LLDPE. The process comprises:
  (a) melting a LLDPE in an extruder to form a molten LLDPE;
  (b) introducing maleic anhydride into the extruder; and
  (c) contacting the molten LLDPE with the maleic anhydride in the extruder at conditions effective to increase the melt index (MI) of the LLDPE and to form the MAH-g-LLDPE. The MAH-g-LLDPE has a MI of 250 to 800 g/10 minutes and comprises 0.01 to 3 weight percent of maleic anhydride, based on the weight of the MAH-g-LLDPE.

DETAILED DESCRIPTION OF THE INVENTION

A maleic anhydride grafted linear low-density polyethylene (MAH-g-LLDPE) with a unique combination of useful properties has been surprisingly discovered. These useful properties include a low density, a high melt index, and greater adhesion over a wide temperature range. The MAH-g-LLDPE, as an additive, can also enhance the properties of existing hot melt adhesive formulations.

Thus, in one aspect, the present invention provides a linear low-density polyethylene (LLDPE) grafted with maleic anhydride. The MAH-g-LLDPE has a melt index (MI) of 250 to 800 g/10 minutes and comprises 0.01 to 3 weight percent of maleic anhydride, based on the weight of the MAH-g-LLDPE.

Prior to grafting, the LLDPE generally has a density in the range of 0.880 to 0.930 g/cm$^3$. Preferably, the LLDPE has a density of 0.880 to 0.928 g/cm$^3$, 0.880 to 0.925 g/cm$^3$, 0.880 to 0.923 g/cm$^3$, 0.880 to 0.920 g/cm$^3$, 0.880 to 0.918 g/cm$^3$, 0.890 to 0.930 g/cm$^3$, 0.890 to 0.928 g/cm$^3$, 0.890 to 0.925 g/cm$^3$, 0.890 to 0.923 g/cm$^3$, 0.890 to 0.920 g/cm$^3$, 0.890 to 0.918 g/cm$^3$, 0.900 to 0.930 g/cm$^3$, 0.900 to 0.928 g/cm$^3$, 0.900 to 0.925 g/cm$^3$, 0.900 to 0.923 g/cm$^3$, 0.900 to 0.920 g/cm$^3$, or 0.900 to 0.918 g/cm$^3$. After grafting, the density of the MAH-g-LLDPE may increase slightly from the initial density of the LLDPE (e.g., +0.001 to 0.010 g/cm$^3$).

LLDPEs are generally copolymers of ethylene and one or more $\alpha$-olefins having 3 to 10 carbon atoms. Examples of such olefins include propylene, 1-butene, 1-pentene, 1-hexene, 1-heptene, 1-octene, 4-methyl-1-pentene, 1-decene, and the like. Preferred LLDPEs include copolymers of ethylene and one or more $\alpha$-olefins selected from 1-butene, 1-hexene, and 1-octene. The copolymers generally have an ethylene content ranging from 50 to 99.5 wt %, 70 to 99.5 wt %, or 80 to 99.5 wt %.

Before grafting, the LLDPEs useful in the present invention generally have a melt index in the range of 0.1 to 10 g/10 min., 0.5 to 10 g/10 min., 0.5 to 5 g/10 min., or 0.5 to 1 g/10 min.

LLDPEs having these characteristics are available commercially from manufacturers such as Westlake Chemical Corporation and Dow Chemical Company. Alternatively, they may be made according to methods known in the art such as that described in U.S. Pat. No. 7,652,113 B2.

Preferably, the MAH-g-LLDPE has a maleic anhydride content of 0.1 to 2 wt % or 0.5 to 1.5 wt %. The amount of MAH grafting is sometimes referred to as the acid number, where 1 wt % of MAH grafting is equivalent to an acid number of approximately 5.67.

Preferably, the MAH-g-LLDPE according to the invention has an MI in the range of 300 to 800 g/10 min., 350 to 800 g/10 min., 400 to 800 g/10 min., 450 to 800 g/10 min. 500 to 800 g/10 min. 300 to 750 g/10 min. 350 to 750 g/10 min. 400 to 750 g/10 min. 450 to 750 g/10 min. 500 to 750 g/10 min. 300 to 700 g/10 min. 350 to 700 g/10 min. 400 to 700 g/10 min. 450 to 700 g/10 min. 500 to 700 g/10 min. 300 to 600 g/10 min. 325 to 600 g/10 min. 350 to 600 g/10 min. 375 to 600 g/10 min. 400 to 600 g/10 min. 300 to 550 g/10 min. 325 to 550 g/10 min. 350 to 550 g/10 min., 375 to 550 g/10 min. 400 to 550 g/10 min. 425 to 550 g/10 min. or 450 to 550 g/10 min.

The MAH-g-LLDPE according to the invention may be prepared by a process comprising the steps of:

(a) melting a LLDPE in an extruder to form a molten LLDPE;

(b) introducing maleic anhydride into the extruder; and (c) contacting the molten LLDPE with the maleic anhydride in the extruder at conditions effective to increase the melt index (MI) of the LLDPE and to form the MAH-g-LLDPE.

Any LLDPE described herein may be used in step (a), including a LLDPE having a density of 0.880 to 0.930 g/cm$^3$, 0.880 to 0.925 g/cm$^3$, 0.880 to 0.920 g/cm$^3$, 0.900 to 0.920 g/cm$^3$, or 0.900 to 0.918 g/cm$^3$.

The process according to the invention may be conducted in a continuous or batch mode, with continuous being preferred. The process may be carried out in any extruder typically used to process polyethylenes, such as single or multi-screw extruders. Multi-screw extruders are generally preferred, with a twin-screw extruder being most preferred. In general, the twin-screw extruder has two shafts that are preferably intermeshing, and that may be either co-rotating or counter-rotating. As used herein, the term "intermeshing" describes shafts that fit together such that the shafts rotate in coordination with each other in close proximity without mechanical interference. The term "co-rotating" describes shafts rotating in the same direction. And the term "counter-rotating" describes shafts rotating in opposite directions.

The extruder typically contains multiple barrels and zones having varying temperatures. Each zone may have one or more barrels. Some zones are operated primarily to melt the polyethylene, while other subsequent zones are operated primarily to lower the viscosity (vis-break) of the polyethylene and/or to facilitate grafting of the maleic anhydride onto the polyethylene. These latter zones are sometimes referred to as reaction zones. The maleic anhydride (MAH) may be introduced either in liquid or solid form into any of the melting zones or reaction zones, or any combination of melting zones and reaction zones. Preferably, the MAH is introduced as a liquid into a barrel of the extruder where the polyethylene is predominately, mostly, or entirely in molten form. For this purpose, the MAH may be melted before being fed into the extruder.

The LLDPE fed into the extruder may be in the form of pellets or reactor powder/fluff/granules.

Typically, sufficient MAH is added to the extruder to yield the desired grafting level. For purposes of the present invention, the desired grafting level includes 0.01 to 3 weight percent, 0.1 to 2 weight percent, and 0.5 to 1.5 weight percent of maleic anhydride, based on the weight of the grafted polymer.

To increase the MI of the LLDPE and to form the MAH-g-LLDPE of the present invention, the extruder is usually operated with a temperature profile ranging from 80 to 600° C. or more typically from 80 to 450° C. The extruder normally has a screw speed of 300 to 600 revolutions per minute (rpm). And the LLDPE typically has an average residence time in the extruder of 1 to 5 minutes or more typically 2 to 4 minutes.

The MI of the product can be controlled by the screw speed, the feed rate of the LLDPE, and/or the degree of shear mixing imparted to the polymer.

The grafting reaction in step (c) is preferably carried out in the absence of an added free radical initiator, even though it is commonly used in other grafting processes.

In a preferred embodiment, the process of the invention includes venting volatiles near the outlet of the extruder. It is preferred that the venting be conducted at a pressure less than atmospheric, such as under vacuum.

The grafted polymer product may be recovered by means known in the art, such as by passing the molten product to an underwater pelletizer or by extruding it through a die into strands, which are cooled in a water bath and subsequently pelletized.

The MAH-g-LLDPE according to the invention has good adhesion to a number of surfaces including nylon, polyvinyl alcohol, polystyrene, polycarbonate, polyolefins (e.g., polypropylene), epoxy resins, and metals (e.g., aluminum and iron). It also has good adhesion to ground tire rubber, glass and other silicon dioxide substrates, and metal oxide substrates as a functional binder. In addition, the inventive material has excellent adhesion to typical substrates commonly used in the packaging industry, such as paper, paperboard, cardboard, and kraft paper. As such, the MAH-g-LLDPE is particularly useful as an adhesive by itself or may be blended with traditional additives to make adhesive compositions, such as hot melt adhesive compositions. In addition to being particularly suited as a base polymer for a hot melt adhesive, the MAH-g-LLDPE according to the invention has a wide range of uses, such as a carpet backing, a compatibilizer in polymer mixtures, and as a tie layer in a multilayer structure. The multilayer structures may include one or more layers of chipboard, aluminum foil, polyethylene, mylar, polypropylene, polyvinylidene chloride, ethylene-vinyl acetate, and kraft paper.

Moreover, the MAH-g-LLDPE can be used as an asphalt modifier to improve interfacial adhesion in asphalt emulsions and asphalt blends as well as can form inner penetrating networks with propylene polymers and copolymers.

The MAH-g-LLDPE of the invention may be blended with one or more conventional additives in typical amounts to prepare useful compositions. Examples of the additives include nucleating agents, heat stabilizers, antioxidants, lubricants, antistatic agents, dispersants, neutralizing agents, foaming agents, plasticizers, anti-foaming agents, flame retardants, crosslinking agents, viscosity enhancers, ultraviolet light absorbers, light stabilizers, slip agents, anti-blocking agents, dyes, pigments, natural oils, synthetic oils, waxes, fillers, and rubbers.

The MAH-g-LLDPE according to the invention is suitable for use in a number of articles of manufacture, such as containers, films, laminates, and coatings. In one embodiment, the article of manufacture is a package. The package may comprise two surfaces of a packaging material, such as cardboard or paperboard, bonded to each other by an adhesive composition according to the invention. The packaging article may be a carton, case, or tray.

As noted, the MAH-g-LLDPE according to the invention is particularly useful in hot melt adhesives (HMAs).

Thus, in another aspect, the invention provides a HMA comprising the MAH-g-LLDPE, a tackifier resin, and a wax.

HMAs typically contain a base polymer, a tackifier resin, and a wax. The MAH-g-LLDPE according to the invention may be used as all or part of the base polymer. Alternatively, the MAH-g-LLDPE may be used as an additive for HMAs. Whether used as a part or all of the base polymer or as an additive, the MAH-g-LLDPE can improve the cohesive strength and/or the bonding strength of the HMA over a wide temperature window.

The HMA according to the invention may contain from 0.5 to 90% by weight of the inventive MAH-g-LLDPE. As the base polymer or a component of the base polymer, the MAH-g-LLDPE may be used in amounts ranging from 30 to 90% by weight, or preferably from 30 to 60% by weight. As a performance enhancer, the MAH-g-LLDPE may be used in amounts ranging from 0.5 to 30% by weight, or preferably from 5 to 15% by weight. All percentages are based on the total weight of the HMA.

In addition to the MAH-g-LLDPE, the HMA may contain one or more conventional base polymers. Examples of conventional base polymers include polyolefins, such as polyethylenes (e.g., LDPE, LLDPE, HDPE, and metallocene-catalyzed polyethylenes (mPEs)), atactic polypropylene, and polybutene; ethylene copolymers, such as ethylene-vinyl acetate copolymers (EVA) and ethylene-unsaturated carboxylic acid or ester copolymers (e.g., ethylene n-butyl acrylate copolymers); polyamides; polyesters; natural or synthetic rubbers, including styrene block copolymers; polyvinyl acetate and vinyl acetate-unsaturated carboxylic acid or ester copolymers; and polyurethanes.

The HMA according to the invention may contain from 30 to 90% by weight of the base polymer, or preferably from 30 to 60% by weight. All percentages are based on the total weight of the HMA.

In one embodiment, the base polymer comprises a mPE. The mPE is typically a copolymer of ethylene and a $C_4$ to $C_8$ α-olefin comonomer, and more typically a copolymer of ethylene and butene-1 or octene-1. The mPE typically has an MI of at least 100 g/10 minutes, more typically of at least 200 g/10 minutes, and most typically of 500 to 2000 g/10 minutes. The mPE may be present in the HMA in an amount ranging from 30% to 60% by weight, based on the weight of the HMA.

Examples of commercially available mPEs include Affinity® and Engage® polymers from Dow Chemical Company. Polymers and adhesives of this type are described in U.S. Pat. Nos. 6,107,430 and 6,319,979.

The tackifier resins or tackifiers suitable for use in the HMAs of the present invention are not particularly limiting. Examples of tackifiers include (a) aliphatic and cycloaliphatic petroleum hydrocarbon resins and the hydrogenated derivatives thereof; (b) aromatic petroleum hydrocarbon resins and the hydrogenated derivatives thereof; (c) aliphatic/aromatic petroleum derived hydrocarbon resins and the hydrogenated derivatives thereof; (d) aromatic modified cycloaliphatic resins and the hydrogenated derivatives thereof; (e) polyterpene resins and hydrogenated polyterpene resins; and (f) copolymers and terpolymers of natural terpenes, styrene/terpene, α-methyl styrene/terpene, and vinyl toluene/terpene. Mixtures of two or more tackifiers may be used.

The Ring & Ball Softening Point, as determined by ASTM E-28, of the tackifier may be in the range of 70 to 140° C., 80 to 140° C., or 90 to 140° C.

The HMA according to the invention may contain from 15 to 40% by weight of the tackifier, or preferably from 25 to 35% by weight. All percentages are based on the total weight of the HMA.

The wax suitable for use in the HMAs of the present invention are not particularly limiting. Examples of useful waxes include (1) low molecular weight (100-6000 g/mol) polyethylenes; (2) petroleum waxes, such as paraffin wax having a softening point from 130 to 170° F. and microcrystalline wax having a softening point from 135 to 200° F.; (3) metallocene-catalyzed propylene-based waxes; (4) metallocene-catalyzed or single-site catalyzed waxes (e.g., those described in U.S. Pat. Nos. 4,914,253; 6,319,979; WO 97/33921; and WO 98/03603); (5) synthetic waxes made by polymerizing carbon monoxide and hydrogen, such as Fischer-Tropsch wax; and (6) polyolefin waxes. Other materials that can be used as the wax include hydrogenated animal, fish, and vegetable fats and oils, such as hydrogenated tallow, lard, soy oil, palm oil, cottonseed oil, castor oil, etc. These hydrogenated materials are often referred to as "animal or vegetable waxes." Mixtures of two or more waxes may be used.

The HMA according to the invention may contain from 5 to 30% by weight of the wax, or preferably from 10 to 20% by weight. All percentages are based on the total weight of the HMA.

The HMA may also include one or more stabilizers or antioxidants. The stabilizers are typically used to help protect the polymer components from thermal and/or oxidative degradation, which can occur during the manufacture or application of the HMA as well as during normal exposure to ambient conditions. A typical stabilizer includes pentaerythritol tetrakis(3,5-di-tert-butyl-4-hydroxyhydrocinnamate) (CAS #6683-19-8), which is commercially available as Irganox® 1010 or BNX® 1010.

The stabilizers may present in the HMA in typical amounts, such as from 0.1 to 1% by weight, based on the total weight of the HMA.

The HMA may also include other traditional additives in typical amounts, such as nucleating agents, heat stabilizers, lubricants, antistatic agents, dispersants, neutralizing agents, foaming agents, plasticizers, anti-foaming agents, flame retardants, crosslinking agents, viscosity enhancers, ultraviolet light absorbers, light stabilizers, slip agents, antiblocking agents, dyes, pigments, natural oils, synthetic oils, fillers, and rubbers.

The adhesive compositions of the invention, including the HMAs, may be prepared by techniques known in the art. For example, the ingredients may be placed in a jacketed vessel equipped with a stirrer and heated to an elevated temperature, for example, in the range of 120 to 200° C. Once the solid ingredients are melted, stirring may be initiated for a sufficient time to form a homogeneous mixture, and then the mixture allowed to cool. The precise temperature used would depend on the melting point of the particular ingredients and the viscosity of the finished adhesive composition. The mixing may be performed under an inert gas atmosphere (such as nitrogen) or under a mild vacuum.

The adhesive compositions of the invention can be applied to substrates by techniques known in the art, such as extrusion, slot coating, spiral spray, melt-blown, spray-splatter, screen-printing, or roll-coating by delivery from bulk reservoirs capable of controlling the temperature within a range of, for example, 120 to 200° C.

The present invention includes and expressly contemplates any and all combinations of embodiments, features, characteristics, parameters, and/or ranges disclosed herein. That is, the invention may be defined by any combination of embodiments, features, characteristics, parameters, and/or ranges mentioned herein.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered to be approximations (even when not qualified by the term "about"). These values and ranges may vary from their stated numbers depending upon the desired properties sought to be obtained by the present invention as well as the variations resulting from the standard deviation found in the measuring techniques. Moreover, the ranges described herein are intended and specifically contemplated to include all sub-ranges and values within the stated ranges. For example, a range of 50 to 100 is intended to describe and include all values within the range including sub-ranges such as 60 to 90 and 70 to 80.

The content of all documents cited herein, including patents as well as non-patent literature, is hereby incorporated by reference in their entirety. To the extent that any incorporated subject matter contradicts with any disclosure herein, the disclosure herein shall take precedence over the incorporated content.

This invention can be further illustrated by the following examples of preferred embodiments thereof, although it will be understood that these examples are included merely for purposes of illustration and are not intended to limit the scope of the invention.

EXAMPLES

Analytical Measurements

In the following examples, the test procedures listed below were used to evaluate the properties of the LLDPE and the MAH-g-LLDPE product.

Density was determined in accordance with ASTM D2839-93 except for the following:
 a) The conditioning procedure as described in paragraphs 7.2 and 7.3 was omitted.
 b) The strand was conditioned for 30 minutes at 23° C.
 c) The density was determined in accordance with ASTM D1505 immediately following paragraph 7.4.
 d) The density was determined by averaging the density values of at least three test specimens. The maximum difference allowed between the lowest density test specimen and the highest density test specimen was 0.0005 g/cm³. If this difference was >0.0005 g/cm³, then the test was repeated starting with paragraph 7.1.

Melt Index (MI), 12, was determined in accord with ASTM D1238, Condition 190/2.16 and reported as "g/10 min."

Viscosity was measured according to ASTM D3237.

Gardner Color was determined according to ASTM D1544.

Peel Adhesion Failure Test (PAFT) was performed using ASTM D4498.

Shear Adhesion Failure Test (SAFT) was performed using ASTM D4498.

The Corrugated Bonds Test involved making glue-ups (0.5-inch wide strips of the hot melt adhesive) and heat sealing the samples at 350° F. using a typical 45-lb corrugated board stock from Inland Container. The samples were aged at refrigerator (approx. 37° F.) and freezer temperatures (approx. 10° F.) for 24 hours and pulled by hand. The values reported are the average percent fiber tear of the bonds.

Examples 1-7

Preparation of Maleic Anhydride Grafted Polyethylene

Pellets of a linear low density polyethylene (LLDPE) produced by Westlake Chemical Corporation, Houston, Tex., were fed with a volumetric pellet feeder into the inlet hopper of a 25-mm twin-screw extruder having 12 barrels (grouped into three zones) and a die. The extruder had 12 kneading/mixing elements in each of the three zones. The LLDPE was composed ethylene and 1-hexene, and was characterized by having an MI of 0.5 g/10 min and a density of 0.906 g/cm³. The LLDPE was fed into the extruder at barrel 1 and melted. The molten LLDPE was thereafter passed from one barrel to the next until it reached the die. Molten maleic anhydride (MAH) was pumped into the extruder at barrel 4. A second liquid injection port fed an anti-oxidant into the molten mixture at barrel 12. Vacuum venting was also conducted at barrel 12. The resultant LLDPE was recovered by extruding the molten product into a standard cold water stranding bath. The average residence time of the LLDPE in the extruder was 2.5 to 3.2 minutes. The melt index of the product was controlled by the screw speed and the feed rate of the LLDPE. The cooled strands were subsequently chopped into pellets. The resultant grafted LLDPE product (MAH-g-LLDPE) was analyzed.

The process conditions used and the properties of the MAH-g-LLDPE are reported in Table 1.

TABLE 1

| | Example Number | | | | | | |
|---|---|---|---|---|---|---|---|
| Extruder Barrel No. | 1 Temp. (° C.) | 2 Temp. (° C.) | 3 Temp. (° C.) | 4 Temp. (° C.) | 5 Temp. (° C.) | 6 Temp. (° C.) | 7 Temp. (° C.) |
| 1 | 80 | 80 | 80 | 80 | 80 | 80 | 80 |
| 2 | 250 | 250 | 255 | 255 | 255 | 255 | 255 |
| 3 | 240 | 230 | 240 | 240 | 240 | 240 | 240 |
| 4 | 290 | 270 | 240 | 240 | 240 | 240 | 255 |
| 5 | 420 | 405 | 425 | 425 | 425 | 425 | 425 |
| 6 | 420 | 410 | 425 | 425 | 425 | 425 | 425 |
| 7 | 420 | 410 | 425 | 425 | 425 | 425 | 425 |
| 8 | 420 | 410 | 425 | 425 | 425 | 415 | 425 |
| 9 | 420 | 410 | 425 | 425 | 425 | 425 | 425 |
| 10 | 290 | 250 | 200 | 200 | 200 | 200 | 200 |
| 11 | 200 | 200 | 200 | 200 | 200 | 200 | 200 |
| 12 | 200 | 200 | 200 | 200 | 200 | 200 | 200 |
| Die | 205 | 205 | 200 | 200 | 200 | 200 | 200 |
| Screw Speed (rpm) | 480 | 450 | 480 | 480 | 480 | 480 | 480 |
| Vacuum (inch Hg) | 29 | 29 | 29 | 29 | 29 | 29 | 29 |
| Pellet Feeder Rate (lb/hr) | 7 | 7 | 7 | 7.5 | 7.3 | 7.3 | 7 |
| Output Rate (lb/hr) | 6.93 | 7.06 | 6.95 | 7.59 | 7.4 | 7.3 | 7.9 |
| MAH Feed Rate (mL/min) | 0.4 | 4 | 0.3 | 0.3 | 0.3 | 0.3 | 0.3 |

TABLE 1-continued

| Extruder Barrel No. | Example Number | | | | | | |
|---|---|---|---|---|---|---|---|
| | 1 Temp. (° C.) | 2 Temp. (° C.) | 3 Temp. (° C.) | 4 Temp. (° C.) | 5 Temp. (° C.) | 6 Temp. (° C.) | 7 Temp. (° C.) |
| MAH Pump Discharge Pressure (psi) | 60 | 80 | 55 | 60 | 70 | 70 | 75 |
| MAH-g-LLDPE Melt Index (g/10 min) | 259 | 120 | 422 | 327 | 277 | 209 | 306 |
| MAH-g-LLDPE Acid Number | 5.6 | 3 | not measured | not measured | not measured | not measured | not measured |

Examples 8-10

Preparation of Hot Melt Adhesives

Hot melt adhesive blends were prepared by placing the desired quantities of each material listed in Table 2 in a beaker. The beaker was placed in a heating mantle connected to a controller capable of maintaining the vessel and contents at 180° C. A Silverstein stirrer with a 3-blade paddle stirrer was lowered into the beaker, and when the contents of the beaker melted, the stirrer was started. The beaker was fitted with a metal lid with a nitrogen inlet, and the entire beaker was kept under nitrogen for the duration. The materials were mixed for 30 minutes after melting and allowed to cool.

Each composition was then tested for the properties listed in Table 2.

MAH-g-LLDPE in Table 2 is the material produced from Example 1.

W40-014 is a vis-broken, unmaleated LLDPE. It was produced from the same LLDPE used as the starting material in Example 1. It was vis-broken using the procedures of Example 1, but without the MAH. The vis-broken LLDPE had a density of 0.909 g/cm³ and an MI of 330 g/10 min.

AFFINITY GA 1950 is a polyolefin plastomer from Dow Chemical Company. The plastomer is reported as having a density of 0.874 g/cm³, a Brookfield Viscosity at 350° F. (177° C.) of 17,000 cP, an MI of 500 g/10 min., and a DSC melting point of 70° C.

TABLE 2

| | Example 8 Amount (wt %) | Example 9 (Comparative) Amount (wt %) | Example 10 (Comparative) Amount (wt %) |
|---|---|---|---|
| Ingredient | | | |
| MAH-g-LLDPE | 40 | 0 | 0 |
| W40-014 | 0 | 40 | 0 |
| Affinity GA 1950 | 0 | 0 | 40 |
| Sasol H1 (wax) | 25 | 25 | 25 |
| Escorez 5637 (tackifier) | 34.5 | 34.5 | 34.5 |
| Irganox 1010 (anti-oxidant) | 0.5 | 0.5 | 0.5 |
| Initial Properties | | | |
| Viscosity at 150° C. (cP) | 4430 | 4370 | 2185 |
| Viscosity at 177° C. (cP) | 2215 | 2240 | 1060 |
| Gardner Color | 3 | 1 | 1 |
| PAFT (° C.) | 67 | 65 | 62 |
| SAFT (° C.) | 111 | 113 | 94 |
| Corrugated Bonds at −20° C. (% fiber tear) | 0 | 0 | 50 |
| Corrugated Bonds at 2° C. (% fiber tear) | 25 | 0 | 100 |
| Properties After 100 hrs at 177° C. | | | |
| Viscosity at 177° C. (cP) | 2385 | 2250 | 1070 |
| Gardner Color | 14 | 15 | 13 |
| Skin/Char | Edge ring | 30% scum | clear |

As seen from Table 2, the hot melt adhesive based on AFFINITY GA 1950 (Ex. 10) had better adhesion than the non-maleated, vis-broken LLDPE (Ex. 9) and the non-optimized MAH-g-PE of Example 1 (Ex. 8), according to the Corrugated Bonds Test at reduced temperatures. However, the high-temperature adhesion (PAFT and SAFT values) of the non-optimized MAH-g-LLDPE (Ex. 8) was good relative to the comparative cases. And the non-optimized MAH-g-LLDPE (Ex. 8) was intermediate in thermal stability testing.

Examples 11-13

Another MAH-g-LLDPE was made following the procedures described in Examples 1-7, except that a different screw was used to impart more kinetic energy/shear into the polymer. The screw had (1) more mixing elements into the first zone of the extruder and a reverse element after 5 mixing elements to slow the polymer flow through the zone, (2) additional kneading blocks in the second zone (in place of conveying elements), and (3) both kneading blocks and a reverse element in the final zone. The MAH-g-LLDPE product had an MI of 500 g/10 min. and an acid number of 4.5. It is designated as DA-27 in Table 3.

In each example, DA-27 was blended with the additives listed in Table 3 using the procedure outlined in Examples 8-10 to make an adhesive composition. The composition was then tested for the properties listed in Table 3.

Example 14 Comparative

Pellets of Dow's AFFINITY GA 1950 were blended with the additives listed in Table 3 using the procedure outlined in Examples 8-10 to make an adhesive composition. The composition was then tested for the properties listed in Table 3.

Example 15 Comparative

Pellets of an ethylene-vinyl acetate (EVA) copolymer from Arkema sold under the name EVATANE 28-420 was blended with the additives listed in Table 3 using the procedure outlined in Examples 8-10 to make an adhesive composition.

The EVA copolymer is reported as having a density of 0.950 g/cm$^3$, a vinyl acetate content of 27-29 wt %, an MI of 370-470 g/10 min., and a melting point of 66° C. The composition was then tested for the properties listed in Table 3.

TABLE 3

| | Example Number | | | | |
|---|---|---|---|---|---|
| | 11 Amount (wt %) | 12 Amount (wt %) | 13 Amount (wt %) | 14 (Comp.) Amount (wt %) | 15 (Comp.) Amount (wt %) |
| Ingredient | | | | | |
| DA-27 | 40 | 60 | 40 | — | — |
| EVATANE 28-420 | — | — | — | — | 40 |
| Affinity GA 1950 | — | — | — | 40 | — |
| EASTOTAC H100W (tackifier) | 39.5 | 29.5 | 39.5 | 39.5 | 39.5 |
| Sasol H1 (wax) | 19.5 | 9.5 | 0 | 19.5 | 10 |
| EPOLENE N21 (wax) | — | — | 19.5 | — | — |
| Parafin Wax | — | — | — | — | 9.5 |
| Irganox 1010 (antioxidant) | 1 | 1 | 1 | 1 | 1 |
| Properties | | | | | |
| Initial Viscosity at 177° C. (cP) | 1707 | 5866 | 3170 | 1210 | 967 |
| PAFT (° C.) | 81.0/0.4 | 89.9/7.4 | 82.2/18.9 | 65.1/3.6 | 47.9/1.0 |
| SAFT (° C.) | 123.3/0.8 | 125.1/1.7 | 124.8/0.8 | 92.2/2.7 | 75.1/1.3 |
| Fiber Tear at 0° F. (%) | 100 (4x) | 100 (4x) | 100 (4x) | 100 (4x) | 100 (4x) |
| Fiber Tear at 20° F. (%) | 100 (4x) | 100 (4x) | 100 (4x) | 100 (4x) | 100 (4x) |
| Fiber Tear at 40° F. (%) | 100 (4x) | 100 (4x) | 100 (4x) | 100 (4x) | 100 (4x) |
| Fiber Tear at Room Temp. (%) | 100 (4x) | 100 (4x) | 100 (4x) | 100 (4x) | 100 (3x), 50 |
| Fiber Tear at 135° F. (%) | 100 (4x) | 100 (4x) | 100 (4x) | 100 (4x) | 75 (3x), 25 |

As seen from Table 3, the hot melt adhesives (HMAs) containing DA-27 as the base polymer (Exs. 11-13) had greater PAFT and SAFT values than the comparative blends (Exs. 14 and 15), indicating improved cohesive strength and better bonding performance. The fiber tear results show that the HMAs containing DA-27 performed as well as or better than the comparative blends over a wide temperature window.

Examples 16-18

Examples 11, 14, and 15 were repeated, but with only 35 wt % of the base polymers DA-27, Affinity GA 1950, and Evatane 28-420, respectively. The results are shown in Table 4 below.

TABLE 4

| | Example Number | | |
|---|---|---|---|
| | 16 Amount (wt %) | 17 (Comparative) Amount (wt %) | 18 (Comparative) Amount (wt %) |
| Ingredient | | | |
| DA-27 | 35 | — | — |
| EVATANE 28-420 | — | — | 35 |
| Affinity GA 1950 | — | 35 | — |

TABLE 4-continued

| | Example Number | | |
|---|---|---|---|
| | 16 Amount (wt %) | 17 (Comparative) Amount (wt %) | 18 (Comparative) Amount (wt %) |
| EASTOTAC H100W (tackifier) | 44.5 | 44.5 | 44.5 |
| Sasol H1 (wax) | 19.5 | 20 | 10 |

TABLE 4-continued

| | Example Number | | |
|---|---|---|---|
| | 16 Amount (wt %) | 17 (Comparative) Amount (wt %) | 18 (Comparative) Amount (wt %) |
| Parafin Wax | 0 | 0 | 10 |
| Irganox 1010 (antioxidant) | 1 | 0.5 | 0.5 |
| Properties | | | |
| Initial Viscosity at 177° C. (cP) | 1337 | 900 | 780 |
| PAFT (° C.) | 77.1/10.5 | 65 | 48/4 |
| SAFT (° C.) | 118.5/3.6 | 93 | 71/2 |
| Fiber Tear at 0° F. (%) | 0, 75, 75, 100 | 100 | 50 |
| Fiber Tear at 20° F. (%) | 0, 0, 50, 50 | 100 | 100 |
| Fiber Tear at 40° F. (%) | 0 (4x) | 100 | 100 |
| Fiber Tear at Room Temp. (%) | 25 (4x) | 100 | 100 |
| Fiber Tear at 135° F. (%) | 100 (4x) | 100 | 75 |

As seen from Table 4, the PAFT and SAFT values of the HMA containing DA-27 (Ex. 16) were greater than those of the comparative blends.

Examples 19-25

HMAs were prepared using the ingredients and proportions listed in Table 5 following the general procedures outlined in Examples 8-10. The HMAs were then tested for the properties listed in Table 5.

Dow's AFFINITY GA 1950 was used as the base polymer in all of the HMAs.

DA-27 (an MAH-g-LLDPE according to the invention) was used as an additive at two concentrations, and compared with two commercially available maleated polyethylene waxes, Honeywell A-C® 575 and A-C® 573.

A-C® 575 is reported has having a density of 0.92 g/cm³, a saponification number of 30-40 mg KOH/g, a Gardner color of 3 max, and a Brookfield viscosity at 140° C. of >1000 cps.

A-C® 573 is reported has having a density of 0.92 g/cm³, a saponification number of 3-6 mg KOH/g, a Gardner color of 2 max, and a Brookfield viscosity at 140° C. of 600 cps max.

The performance testing involved an Institute of Packaging Professionals (IoPP) heat resistance test T-3006 and a bonding performance test at 3 conditioning temperatures. The IoPP T-3006 test is a bond cleavage test where the adhesive was used to bond two pieces of stock corrugated cardboard together. The test was set up according to the IoPP testing protocol. The highest temperature at which the bonds passed was recorded.

TABLE 5

| | Example Number | | | | | | |
|---|---|---|---|---|---|---|---|
| | 19$^a$ Amount (wt %) | 20 Amount (wt %) | 21$^b$ Amount (wt %) | 22$^b$ Amount (wt %) | 23 Amount (wt %) | 24$^b$ Amount (wt %) | 25$^b$ Amount (wt %) |
| Ingredient | | | | | | | |
| Affinity GA 1950 | 35 | 33.1 | 33.1 | 33.1 | 33.1 | 33.1 | 33.1 |
| Eastotac H130R | 39.7 | 37.3 | 37.3 | 37.3 | 34.1 | 34.1 | 34.1 |
| Sasol H1 | 25 | 24.3 | 24.3 | 24.3 | 22.5 | 22.5 | 22.5 |
| DA-27 | — | 5 | — | — | 10 | — | — |
| A-C 575 | — | — | 5 | — | — | 10 | — |
| A-C 573 | — | — | — | 5 | — | — | 10 |
| BNX 1010 | 0.3 | 0.3 | 0.3 | 0.3 | 0.3 | 0.3 | 0.3 |
| Physical Properties | | | | | | | |
| Viscosity at 300° F. (cP) | 1735 | 2150 | 1680 | 1560 | 3300 | 1860 | 1600 |
| Viscosity at 350° F. (cP) | 775 | 1050 | 730 | 720 | 1445 | 810 | 790 |
| Gardner Color | 2 | 3 | 4 | 3 | 4 | 5 | 2 |
| 100 g PAFT (° F.) | 148 | 151 | 149 | 147 | 144 | 143 | 140 |
| 500 g SAFT (° F.) | 190 | 207 | 188 | 197 | 219 | 188 | 203 |
| Performance Properties | | | | | | | |
| IoPP Failure Temp. (° C.) | 60 | 75 | 65 | 70 | 85 | 70 | 70 |
| Bonding Performance at −18° C. Corrugated | NFT | SFT | NFT | NFT | FFT | SFT | SFT |
| Bonding Performance at 2° C. Corrugated | SFT | SFT | SFT | PFT | FFT | PFT | PFT |

TABLE 5-continued

| | Example Number | | | | | | |
|---|---|---|---|---|---|---|---|
| | 19[a] Amount (wt %) | 20 Amount (wt %) | 21[b] Amount (wt %) | 22[b] Amount (wt %) | 23 Amount (wt %) | 24[b] Amount (wt %) | 25[b] Amount (wt %) |
| Bonding Performance at 23° C. Corrugated | FFT | FFT | FFT | FFT | FFT | FFT | FFT |

[a] = Control.
[b] = Comparative.
FFT = Full Fiber Tearing bond (85-100% FT).
PFT = Partial Fiber Tearing bond (50-84% FT).
SFT = Slight Fiber Tearing bond (20-49% FT).
NFT = No Fiber Tearing bond (0-19% FT).

As seen from Table 5, the physical properties of the mixtures reveal that there was an effect, surprisingly, of adding DA-27 to the HMA blends. The 100 g PAFT of the DA-27 blends (Exs. 20 and 23) was slightly raised over the control (Ex. 19) and the other maleated PEs tested (Exs. 21-22 and 24-25). In addition, the 500 g shear value of the DA-27 blends (Exs. 20 and 23) was elevated when compared to the control (Ex. 19) and the other maleated PEs tested (Exs. 21-22 and 24-25). These results indicate that the cohesive strength of the HMAs containing DA-27 as an additive was higher than the other products.

The bonding results show that adding 10 wt % of DA-27 markedly improved the bonding performance of the HMA throughout the temperature range tested. At 5 wt % loading, the HMA containing DA-27 was not as effective, but it still outperformed the adhesives containing the other maleated PE materials.

The IoPP results show that the trend for higher cohesive strength was followed up to the 10 wt % loading level. There was a marked improvement in the IoPP value at both the 5 wt % and the 10 wt % loading levels compared to the other maleated PEs.

The greater heat resistance and the improved bonding strength at freezer temperatures are good indicators that DA-27 is a beneficial additive in metallocene-catalyzed polyethylene-based HMAs.

The invention has been described in detail with particular reference to preferred embodiments thereof, but it will be understood that variations and modifications can be effected within the spirit and scope of the invention.

We claim:

1. A linear low-density polyethylene (LLDPE) grafted with maleic anhydride (MAH-g-LLDPE) in the absence of an added free radical initiator,
   wherein the MAH-g-LLDPE has a melt index (MI) of 250 to 800 g/10 minutes measured according to ASTM D1238, Condition 190/2.16,
   wherein the MAH-g-LLDPE comprises 0.01 to 3 weight percent of maleic anhydride, based on the total weight of the MAH-g-LLDPE, and
   wherein the LLDPE has an MI of 0.1 to 10 g/10 minutes before grafting.

2. The MAH-g-LLDPE according to claim 1, which comprises 0.1 to 2 weight percent of maleic anhydride.

3. The MAH-g-LLDPE according to claim 1, which comprises 0.5 to 1.5 weight percent of maleic anhydride.

4. The MAH-g-LLDPE according to claim 1, wherein the LLDPE has a density of 0.890 to 0.925 g/cm$^3$.

5. The MAH-g-LLDPE according to claim 1, wherein the LLDPE is a copolymer of ethylene and 1-butene, 1-hexene, 1-octene, or mixtures thereof.

6. The MAH-g-LLDPE according to claim 1, which has an MI of 300 to 800 g/10 minutes.

7. The MAH-g-LLDPE according to claim 1, which has an MI of 350 to 800 g/10 minutes.

8. A hot melt adhesive comprising:
   (a) the MAH-g-LLDPE according to claim 1;
   (b) a tackifier resin; and
   (c) a wax.

9. The hot melt adhesive according to claim 8, wherein the MAH-g-LLDPE comprises 0.5 to 1.5 weight percent of maleic anhydride.

10. The hot melt adhesive according to claim 8, wherein the LLDPE has a density of 0.890 to 0.925 g/cm$^3$.

11. The hot melt adhesive according to claim 8, wherein the LLDPE is a copolymer of ethylene and 1-butene, 1-hexene, 1-octene, or mixtures thereof.

12. The hot melt adhesive according to claim 8, which has an MI of 350 to 800 g/10 minutes.

13. The hot melt adhesive according to claim 8, which comprises from 30 to 60% by weight of the MAH-g-LLDPE, based on the total weight of the hot melt adhesive.

14. The hot melt adhesive according to claim 8, which comprises from 5 to 15% by weight of the MAH-g-LLDPE, based on the total weight of the hot melt adhesive.

15. The hot melt adhesive according to claim 8, which further comprises a base polymer comprising a metallocene-catalyzed polyethylene.

16. A process for preparing a linear low-density polyethylene (LLDPE) grafted with maleic anhydride (MAH-g-LLDPE), the process comprising:
   (a) melting a LLDPE having a melt index (MI) of 0.1 to 10 g/10 minutes in an extruder to form a molten LLDPE;
   (b) introducing maleic anhydride into the extruder; and
   (c) contacting the molten LLDPE with the maleic anhydride in the extruder at conditions effective to increase the MI of the LLDPE and to form the MAH-g-LLDPE,
   wherein step (c) is carried out in the absence of an added free radical initiator,
   wherein the MAH-g-LLDPE has a MI of 250 to 800 g/10 minutes and comprises 0.01 to 3 weight percent of maleic anhydride, based on the weight of the MAH-g-LLDPE, and
   wherein the MI is measured according to ASTM D1238, Condition 190/2.16.

17. The process according to claim 16, wherein the extruder has a temperature profile ranging from 80 to 450° C.

18. The process according to claim 16, wherein the polyethylene has an average residence time in the extruder of 1 to 5 minutes.

19. The process according to claim 16, wherein the extruder has a screw speed of 300 to 600 revolutions per minute.

* * * * *